United States Patent [19] [11] 4,074,268

Olson [45] Feb. 14, 1978

[54] ELECTRONICALLY SCANNED ANTENNA

[75] Inventor: Roy H. Olson, Palos Verdes, Calif.

[73] Assignee: Hoffman Electronics Corporation, El Monte, Calif.

[21] Appl. No.: 697,868

[22] Filed: June 21, 1976

[51] Int. Cl.[2] ................ G01S 1/50

[52] U.S. Cl. ................ 343/106 R; 343/773; 343/854

[58] Field of Search ................ 343/106 R, 854

[56] References Cited

U.S. PATENT DOCUMENTS

| | | | |
|---|---|---|---|
| 2,953,783 | 9/1960 | Schneider | 343/118 |
| 3,474,446 | 10/1969 | Shestag et al. | 343/106 R X |
| 3,851,159 | 11/1974 | Games et al. | 343/106 R X |
| 3,953,855 | 4/1976 | Hollands | 343/106 R |

*Primary Examiner*—Maynard R. Wilbur
*Assistant Examiner*—Richard E. Berger
*Attorney, Agent, or Firm*—Lyon & Lyon

[57] ABSTRACT

There is disclosed herein an antenna for generating a rotating pattern. The pattern is generated electronically, and no physically moving parts are required. An exemplary embodiment of the antenna radiates a cardioid pattern which rotates at a 15Hz rate for use as a Tacan beacon. The structure of the antenna is in the form of a conic monopole above a ground plane. A plurality of vertical modulator fins, providing controllable shorting elements, and a plurality of suppressor posts are added. The modulator fins have associated diodes to which are applied a bias current along with modulating signals which cause the resistance of the diodes to vary with respect to the flow of RF current at the frequencies of interest (such as in the neighborhood of 1 GHz for Tacan usage). Other details of the physical structure of the antenna are shown and described herein, as well as an electronic system for controlling the diodes. In a typical application, the antenna is mounted on an airplane to enable the airplane to serve as a beacon. In this instance, the exemplary system as shown and described herein is adapted to be coupled with the synchro system of the airplane compass for providing a reference with respect to magnetic north so as to properly electronically relate the rotating pattern of the antenna to magnetic north while the airplane upon which the antenna is mounted changes its flight direction.

19 Claims, 12 Drawing Figures

FIG. 3.
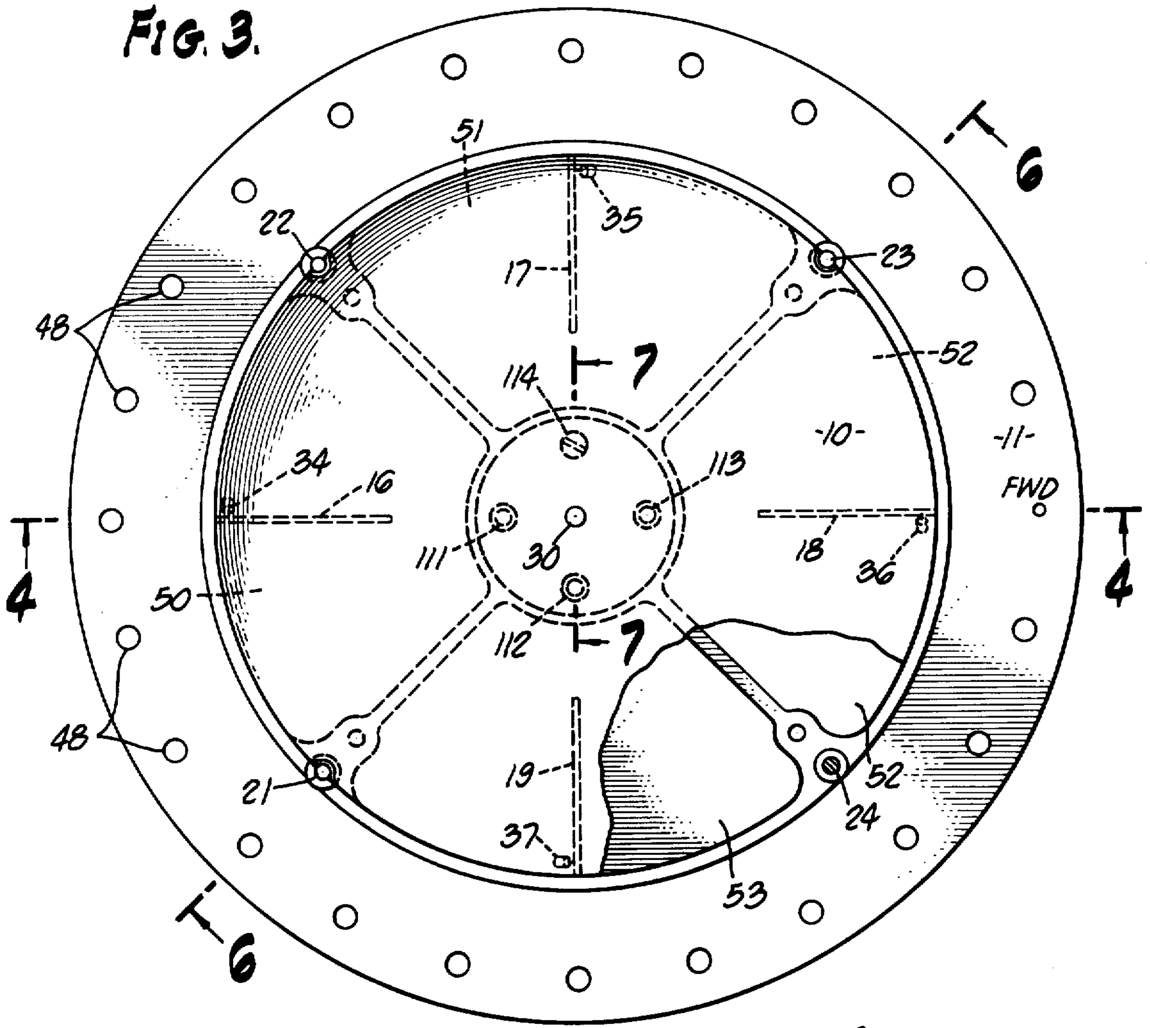
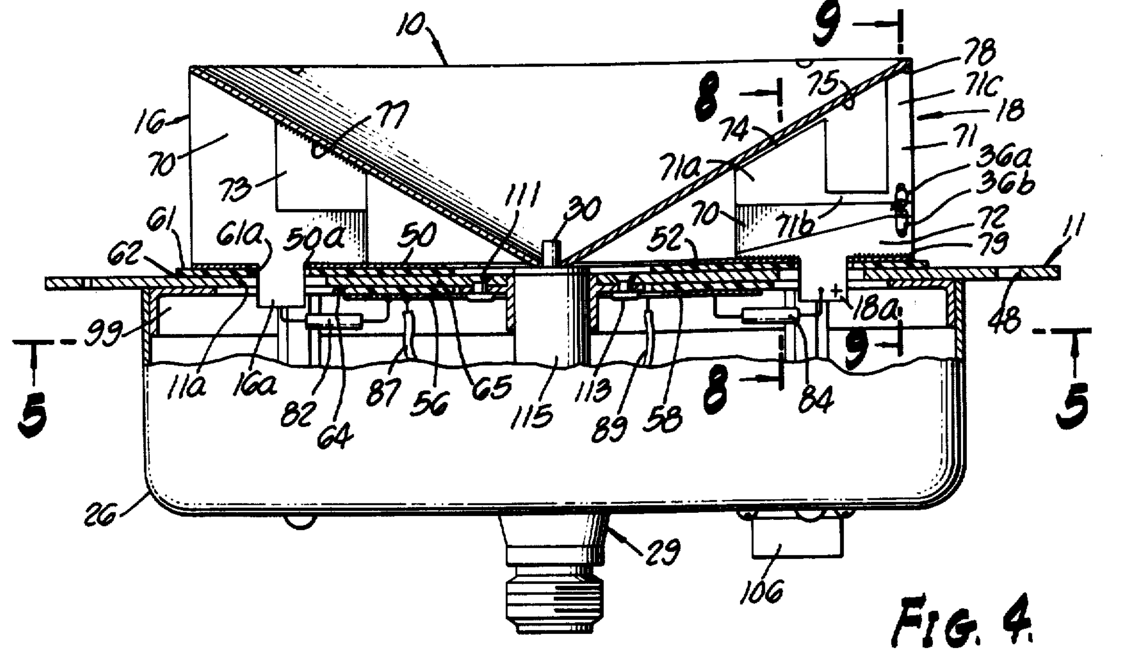
FIG. 4.

FIG. 5
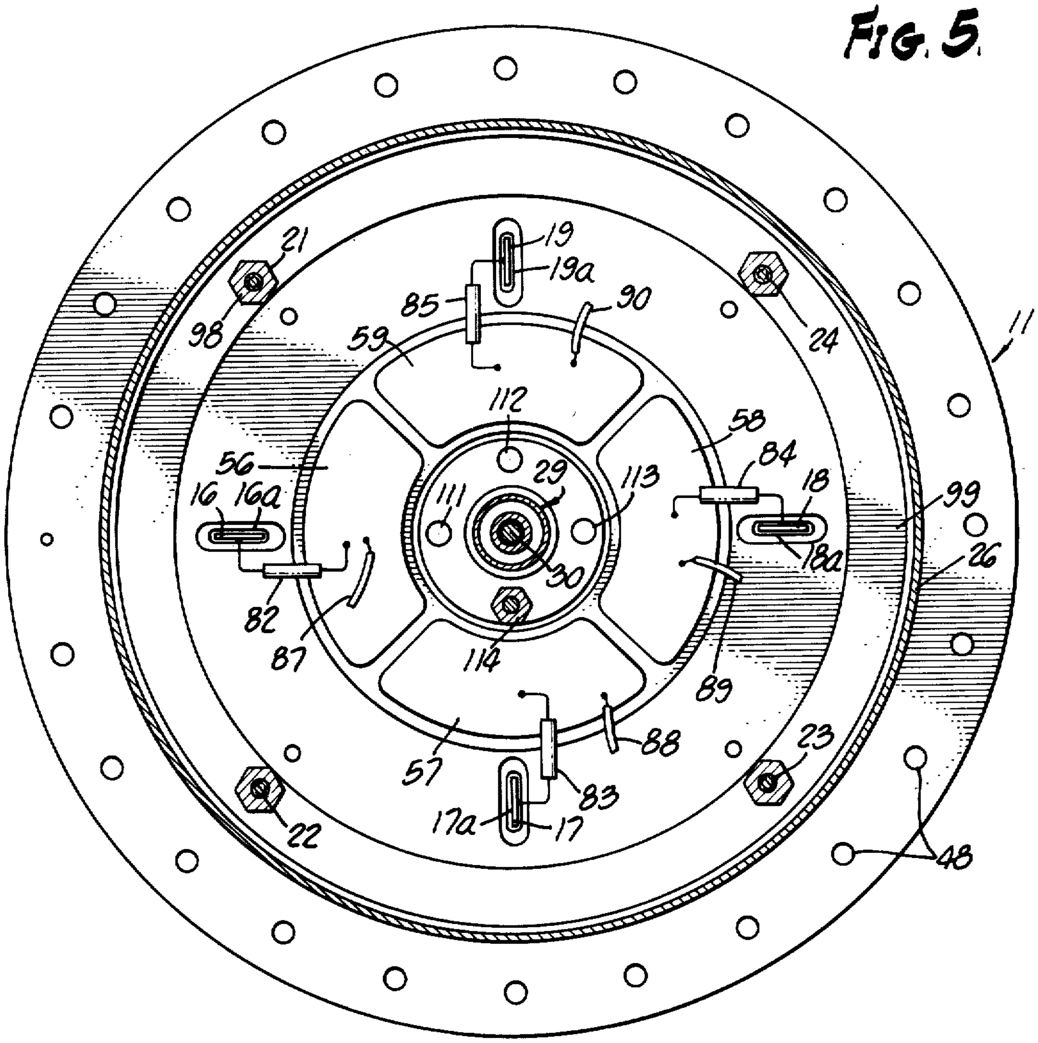
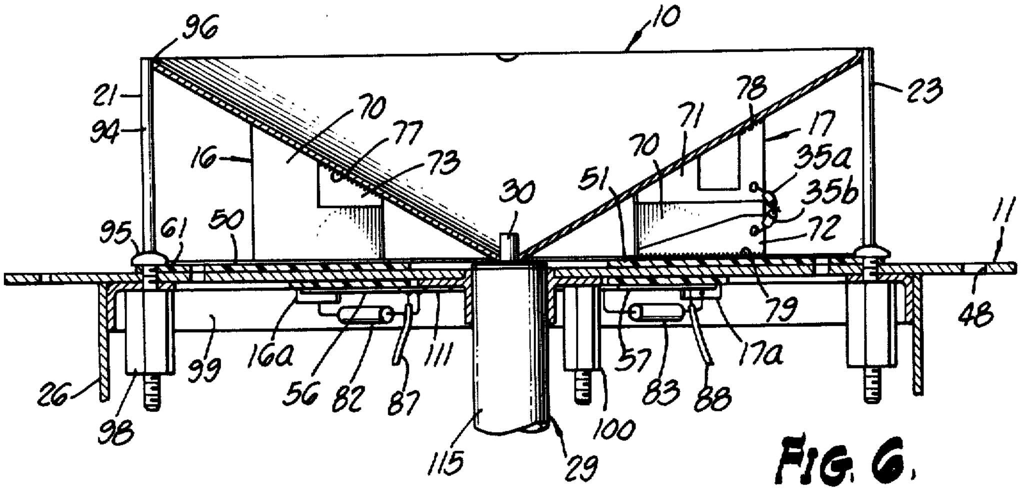
FIG. 6.

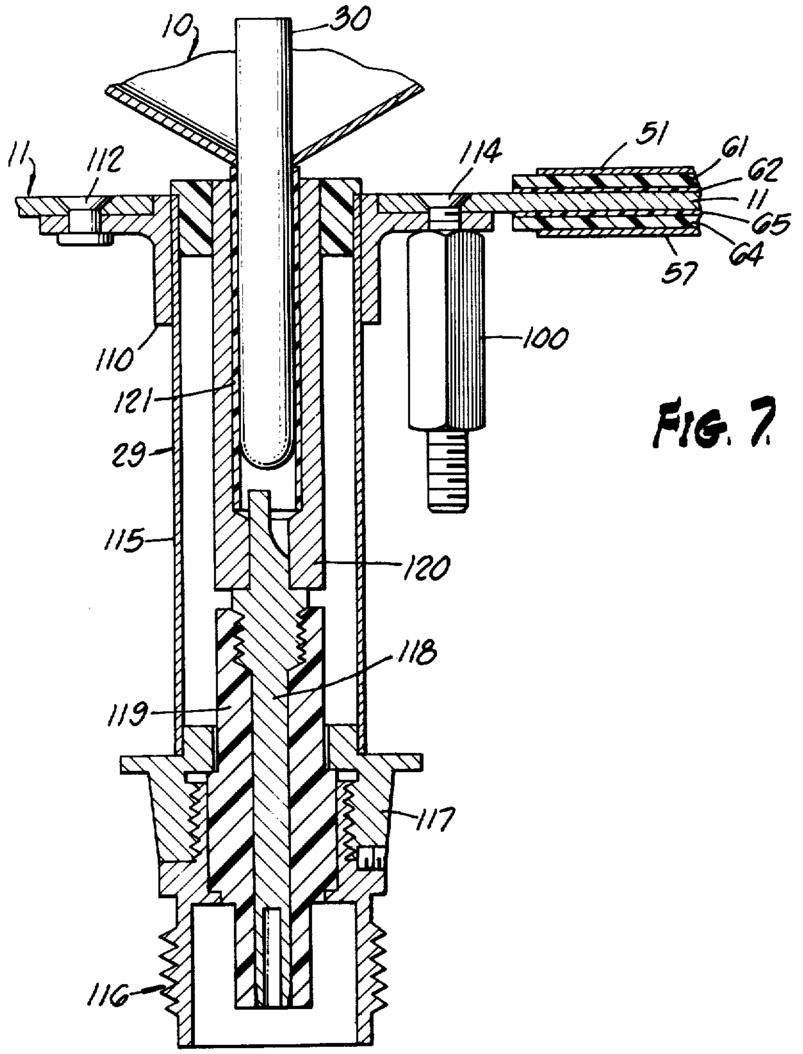
FIG. 7
FIG. 9.
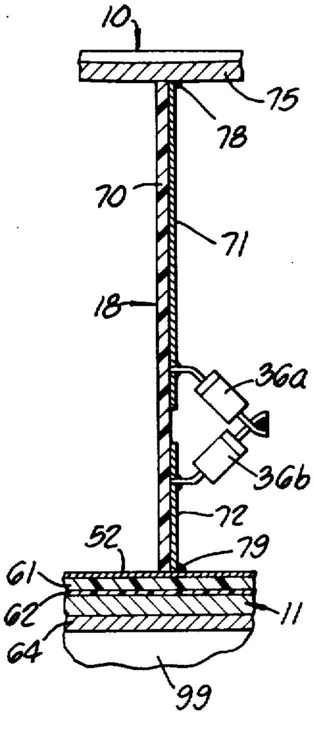
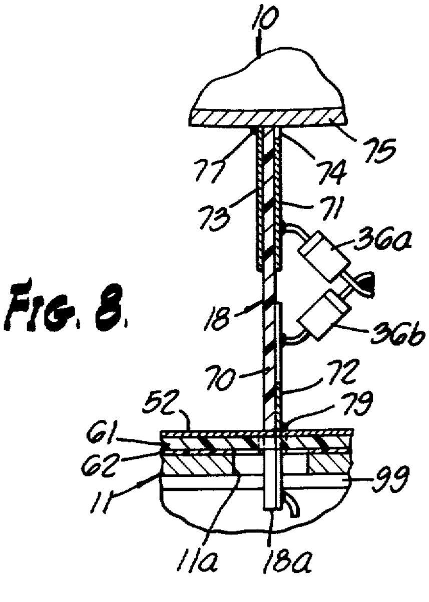
FIG. 8.

ELECTRONICALLY SCANNED ANTENNA

BACKGROUND OF THE INVENTION

This invention relates to antennas, and more particularly to antennas for radiating a cardioid pattern without the requirement of moving parts, as well as an electronic system for controlling the pattern radiated by the antenna and for providing electrical translation between a reference, such as magnetic north, and the pattern radiated by the antenna.

The present invention is particularly useful for generating or radiating a cardioid pattern which rotates a desired frequency, such as 15Hz for use in a tactical air navigation (Tacan) system. Accordingly, the background of the present invention, as well as preferred embodiments of the present invention, will be discussed with respect to Tacan systems and Tacan principles, although it will be appreciated that the antenna structure an electronic system described and claimed herein may be used in other environments.

Turning first to the fundamentals of Tacan range and bearing systems, standardized and existing ground-located Tacan stations transmit a reply pulse-pair-signal in reply to interrogation from an airborne Tacan set. The time duration of these signals is such that a sufficient and satisfactory reply can be made from a ground station for up to 100 interrogating airborne sources. Each aircraft is provided with a range and azimuth read-out with respect to the ground station location. If only a single interrogation exists at any given time in the overall system, the ground station transmitter continues to transmit random squitter pulses such that a total of about 2,700 pulse pairs still are transmitted. Only a few of the total pulse pairs transmitted are precise time replies to the single interrogation, but the function of the other (squitter) pulses is to fill in the time frame so that there is an effective "carrier" of random time pulses that can be amplitude modulated by the transmitting antenna structure.

As is known, a ground Tacan antenna produces an amplitude modulation of the RF output in a space pattern azimuthly. This pattern is caused to rotate at a basic rate of 15 rotations per second. The structure of the antenna comprises a vertical dipole antenna radiating the RF energy in what would normally be (without other associated structure) an omni, that is, uniform circular pattern of amplitudes. This vertical antenna serves as a shaft around which is mounted two concentric non-conductive cylinders. The two cylinders are physically joined and are simultaneously rotated by a servo-controlled motor at 15Hz. The inner cylinder has imbedded in its wall a single vertical conductor dipole such that an amplitude pattern of the RF radiation is established. The second, or outer, cylinder physically attached to the smaller cylinder, has nine vertical conductors spaced 40° apart imbedded in its construction. The alignment of radiating elements is such that one of the nine elements is radially aligned with the single conductor in the smaller cylinder. Because of selected size and radial locations, each outer conductor creates a small amplitude ripple, the whole of which is fixed in relation to the pattern created by the single inner dipole.

When the above-described assembly is rotated, the RF field amplitudes at all distances on any given radial line are caused to vary in such a manner that when demodulated by a receiver there is a 15Hz major sine wave component and a smaller 135Hz sine wave component that are time-synchronized. At a single point in azimuth, the two wave amplitudes are in-phase because the inner and one outer modulating dipole are radially aligned.

A magnetic or optical pick-up is positioned to generate a pulse at one point each 360° rotation of the antenna assembly. This pulse is called the north burst trigger, and it is positioned such that a specific pulse on-the-air burst is transmitted only when the 15Hz RF amplitude lobe maximum-peak is exactly on centerline with magnetic east radial. Stated another way, for a receiver radially aligned along the north magnetic line from the ground beacon, its demodulated 15Hz sine wave will cross the negative-going inflection zero axis exactly the same time as the north reference burst pulse-code group is in the center of its burst.

Neglecting further reference to the 135Hz wave inasmuch as it is present only to increase the precision of phase (i.e., bearing) measurement accuracy, it will be apparent that relative to the moment or precise time of the north reference burst, every increment of angle around the beacon provides a different, but specific, phase relation. An airborne Tacan receiver, therefore, employs the north reference burst to generate a reference 15Hz sine wave, and then compares this internally generated wave with the received 15Hz demodulated wave in a phase detector to provide a bearing read-out of the magnetic bearing heading to the source beacon.

For further details of Tacan systems, antennas, bearing and range measurements, reference may be made to Electronic Avigation Engineering, by Peter C. Sandretto, published by ITT Corporation, 1958. In addition, U.S. Pat. No. 3,474,449 entitled "Phase Angle Measurement System" describes a system for computing or determining the bearing of a movable vehicle from a beacon, such as a Tacan beacon, and illustrates in FIG. 4A thereof the typical Tacan ground beacon radiation pattern. Additionally, U.S. Pat. Nos. 3,281,843, 3,474,447, 3,560,978, 3,670,336, 3,747,102, 3,790,943, 3,795,914, 3,797,019 and 3,863,255 describe antenna systems of interest.

Turning now to a discussion of air-to-air bearing measurements, when a Tacan set is to receive a signal to provide a magnetic bearing from another airborne Tacan signal source, it is evident that the source must be able to provide a 15Hz rotating pattern of amplitude modulation in much the same form as supplied by a ground Tacan beacon station. Since the 15Hz pattern rotation is created by the antenna structure and not by the Tacan electronic system, it follows that the airborne antenna must generate the needed 15Hz rotating pattern to complete the airborne Tacan system package. In addition, some means must be provided to relate or translate the 15Hz pattern to the aircraft heading in order to properly initiate the north burst trigger input to the airborne Tacan transmitter.

Several approaches have been proposed in the past for providing an airborne antenna for radiating or generating the 15Hz pattern. One approach is the provision of a mechanically rotated antenna structure, similar in concept to the conventional ground beacon, installed on the aircraft for generating the appropriate rotating field pattern. However, size, weight, power demand and reliability are drawbacks. In addition, another is an electrically rotated version employed 12 or more pattern-producing digitally switched elements. An example is described in an article entitled, "New Tacan Antennas Offer Gains" by Kenneth J. Stein which appeared at pages 34-37 of the July 24, 1972 issue of *Aviation Week & Space Technology.* Particular drawbacks of a device of this nature are the physical and electronic structure which is not sufficiently broadband for many Tacan applications, the stepped wavefrom produced which is limited by the number of switched elements, and the higher energy losses induced by the greater number of parasitic elements even though they are in a switched-off condition.

SUMMARY OF THE INVENTION

The antenna and associated system of the present invention electrically rotates a 15Hz field pattern, and the antenna and electronic circuitry are relatively simple. The antenna structure basically is a conic monopole above a ground plane, and antennas of this nature are well known in the art for their broadband impedance (e.g., operational range of frequencies) and omni pattern with vertical polarization characteristic. However, the basic antenna structure is modified according to the present invention by the addition of modulator fins placed in the plane of predetermined radials, such as four vertical modulator fins placed on 90° arc radials. A PIN diode is used across a break in the metalization of each fin to enable a modulating current to be applied through the diode. These diodes function as a variable resistance to RF current at Tacan frequencies. Opposite pairs of diodes are considered to be a reversible pole, and a 15Hz sine wave current 180° out of phase is applied to each individually. Since the second pair of diodes is located on an axis 90° from the first pole-pair, the 15Hz modulating current input is also 90° phase quadrature relative to the first pair-pole current input. This arrangement results in rotation of the RF radiated field at a 15Hz, rate, and a depth of amplitude-modulation between 15% to 40% can be achieved. In addition to the modulator fins, shorting posts are used between the edge of the conic and a true ground surface on 90° arc radials between the modulator fins (45° from the fins). These posts function as suppressor posts and also serve to provide a good dc path from the conic to ground as a current return for the diodes.

The antenna system of the present invention also includes an electronic system for providing modulating signals to the modulator fins and for control of generation of the north burst trigger provided by the Tacan set electronics. Additionally, the system provides electrical translation between magnetic north, as derived from an airborne compass, and the pattern radiated by the antenna.

BRIEF DESCRIPTION OF DRAWINGS

These and other objects and advantages of the present invention will become better understood through a consideration of the following description, taken in conjunction with the drawings in which:

FIG. 3 is a top view of the antenna shown in FIG. 1;

FIG. 4 is a cross-sectional elevational view of the antenna taken along line 4—4 of FIG. 3;

FIG. 5 is a bottom view of the antenna taken along the line 5—5 of FIG. 4;

FIG. 6 is a further cross-sectional view of the antenna taken along the line 6—6 of FIG. 3;

FIG. 7 is a cross-sectional view of the RF coax assembly of the antenna structure taken along line 7—7 of FIG. 3;

FIGS. 8 and 9 are fragmentary cross-sectional views of a modulator fin element of the antenna structure respectively taken along lines 8—8 and 9—9 of FIG. 4.

DESCRIPTION OF PREFERRED EMBODIMENT

Figure 1:
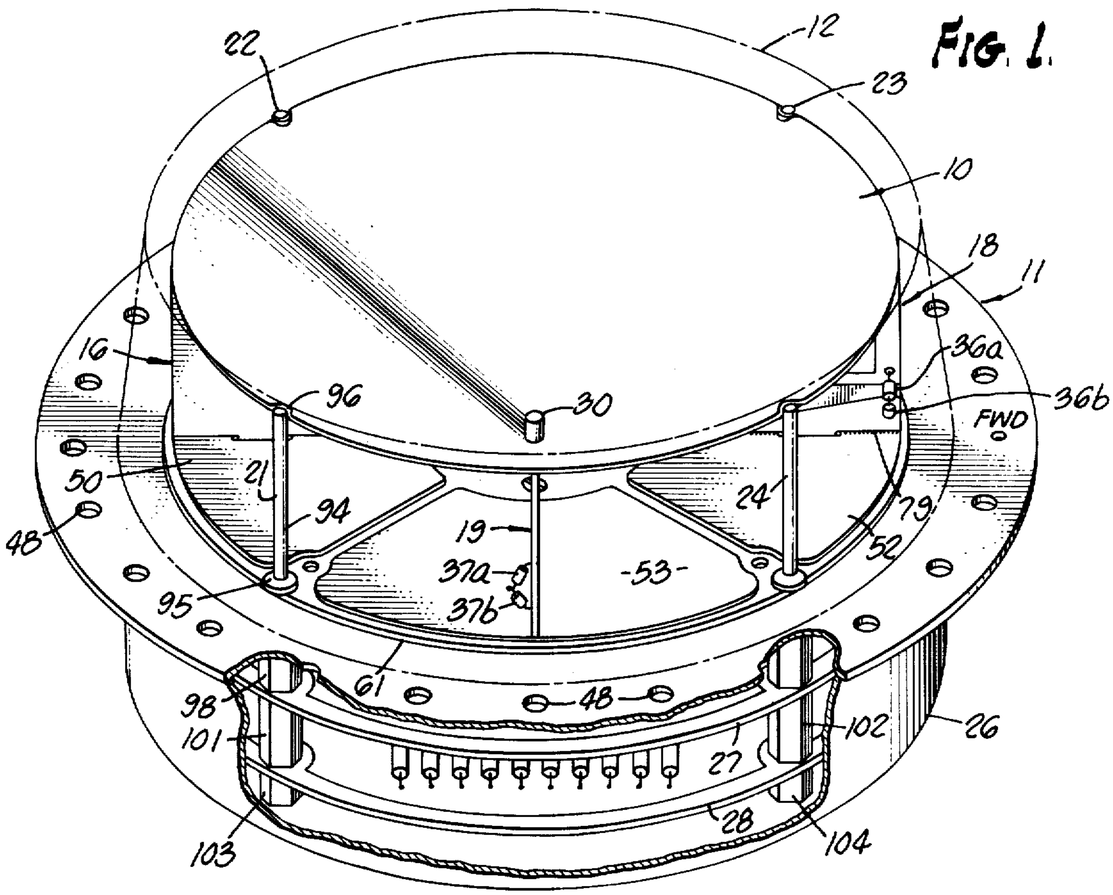
FIG. 1 is a perspective view of the major components of the antenna structure of the present invention.

Turning now to the drawings, and first to FIG. 1, an antenna according to the present invention includes a metal cone 10, or conic monopole, mounted above a ground plane provided by an aluminum baseplate 11. As will be apparent subsequently, the baseplate can be directly affixed to the skin of the airplane. In this case, the upper exposed part of the antenna, including the cone 10, preferably is potted as indicated by dashed lines 12 with a suitable foam for excluding water and other foreign materials and for adding structural support. Polyurethane foam of tiny, thin-walled bubbles has been found suitable.

The antenna structure includes four vertical modulator fins 16 through 19 (note also FIGS. 3, 4, 6, 8 and 9) disposed on 90° arc radials. Similarly, shorting posts or suppressor posts 21 through 24 are disposed on 90° radials between the modulator fins. The antenna structure also includes a lower cover shield 26 which houses electronic circuit boards 27 and 28 mounted below the baseplate 11. An RF coax assembly 29 (note FIG. 4) is included in the assembly and includes a metal rod 30 coupled to the lower end of the cone 10 for supplying RF energy to the cone.

Further details of the antenna structure will be described subsequently. However, at this point it should be noted that each of the modulator fins 16–19 includes a pair of serially connected PIN diodes 34 through 37, respectively, connected across metal plates or segments of the modulator fins (note particularly the right-hand side of FIG. 4 and FIGS. 8 and 9).

Figure 2B:
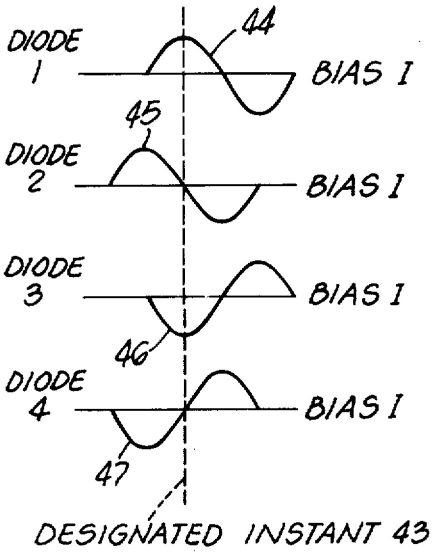
FIGS. 2A and 2B respectively illustrate a 15Hz rotating pattern radiated by the antenna of FIG. 1, and currents of different electrical phases used for modulating components of the antenna.
Figure 2A:
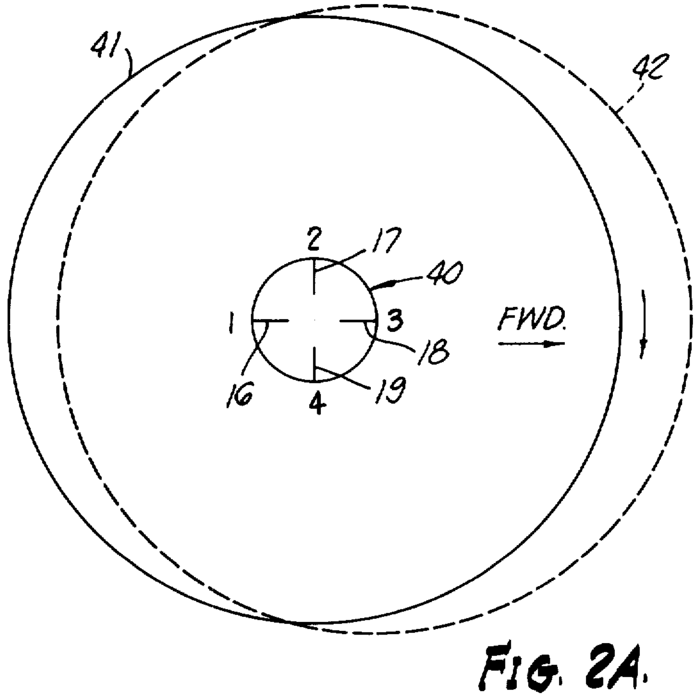

Before continuing with the detailed discussion of the antenna structure, and turning for the moment to FIGS. 2A and 2B, the former diagrammatically illustrates a top view of the antenna at 40 and includes a representation of the modulator fins 16–19. This Figure shows the omni RF field strength pattern 41 as being substantially in the form of a circle with the antenna at the center thereof. This is the pattern generated when the diodes 34–37 of the fins 16–19 have an equal bias current (such as, approximately 0.1ma) and no modulation applied thereto. On the other hand, the RF field strength pattern 42 is generated when the current to the diodes of fin 16 is increased, the current to the diodes of fin 18 is equally reduced, and the currents to the diodes of fins 17 and 19 are equal to the bias current. FIG. 2B illustrates the phase relationship between these modulating currents about a fixed bias level for the four diodes. The numbers 1 through 4 of FIG. 2B correspond with the numbers 1 through 4 of FIG. 2A which, in turn, correspond with respective diodes of fins 16 through 19. The vertical line 43 in FIG. 2B illustrates the magnitude of the modulating currents 44–47 applied to the diodes at the instant the pattern 42 of FIG. 2A is generated. The currents 44 through 47 are applied to the diodes of respective fins 16 through 19, and it will be noted that at the instant designated by the vertical line 43 the curent to the diode of fin 16 is a maximum positive value, and the current applied to the diode of fin 18 is an equal but opposite value. Also, at this time, the modulating currents 45 and 47 applied to the diodes of respective fins 17 and 19 are zero and, thus, only the bias current is applied to these two diodes. Inasmuch as only one diode is fully on at one time, the RF radiated power loss is low.

Through measurements of the amplitude wave-shape demodulated by a receiver, responding to the rotating field from the present antenna, it was determined that a peaking type of distortion occurated at the 45° point between the plane of each modulating fin, and this resulted from too much signal component addition at those planes. The suppressor posts 21 through 24, installed between the upper edge of the cone 10 and ground plane 11, result in the antenna providing a very linear rotation of the pattern of the RF field. These post also serve to provide a good dc return path for the diode currents from the cone 10 to ground.

Turning again to the antenna structure, the principally to FIGS. 1, 4 and 5, the baseplate 11 which forms the ground plane may be circular and formed of aluminum. An exemplary size is a diameter of approximately 8½ inches. The baseplate provides the ground plane, and also the means of attachment (via holes 48) of the antenna to the skin of the aircraft or other structure to which the antenna is attached. An exemplary cone 10 is formed of copper with an angle of approximately thirty degrees with respect to the baseplate 11 and a diameter of approximately 6 inches.

The antenna structure includes four uppr capacitor plates 50 through 53 provided above the baseplate 11, and four RF bypass capacitor plates 56 through 59 (note FIG. 5) disposed below the baseplate 11. These plates form, with baseplate 11 and a dielectric, capacitors and will be referred to as capacitors or capacitor plates in the following discussion. Considering the construction of capacitors 50 and 56 further, and referring to FIG. 4, the upper capacitor plates 50–53 are secured to a dielectric 61, such as fiberglass, which in turn is secured onto the upper surface of the baseplate 11 by a suitable adhesive 62, such as epoxy. The lower capacitors 56 through 59 are similarly formed, with the metal plates secured to a dielectric layer 64, such as fiberglass, which in turn is secured to the lower surface of the baseplate 11 by a suitable adhesive 65, such as epoxy.

Each of the upper capacitor plates 50 through 53, the upper dielectric layer 61 and the baseplate 11 are provided with openings through which tabs **16*a* through 19*a* of the modulator fins 16 through 19 extend. Thus, for example, and considering FIG. 4, capacitor plates 50 includes an opening 50*a* for the tab 16*a* of the modulator fin 16. Similarly, the dielectric layer 61 includes an opening 61*a*, and the baseplate 11 includes an opening 11*a* for the tab 16*a*. Like openings are provided for the tabs 17*a*–19*a* of the fins 17–19. These tabs enable electrical connections to be made (through resistors) to the lower capacitor plates 56 through 59** as will be discussed subsequently.

Turning now to the details of the modulator fins 16 through 19, all four are identical and only the fins 18 and 16 will be discussed in detail with reference to FIGS. 4, 8 and 9. Considering the fin 18, it includes a substrate 70 of insulating material, such as fiberglass, with metal layers thereon. One side (note FIGS. 4 and 9) includes metal layers 71 and 72, and the other side includes a metal layer 73. The layer 71 includes a plate section **71*a* and leg sections 71*b* and 71*c*. It should be noted that there is a gap 74 between the lower surface 75 of the cone 10 and the upper edge of the plate section 71*a* of layer 71 (that is, 10 and 71*a* are not electrically connected at this point). On the other hand, the upper edge of the layer 73 on the opposite side is soldered at 77 to the lower surface 75 of cone 10. Thus, the layers 73 and 71*a* form a capacitor. The upper edge of the leg sections 71*c* of layer 71 is soldered at 78 to the lower surface 75 of the cone 10. The leg sections 71*b*–71*c*** form inductances at the RF frequencies involved.

The PIN diode 36 preferably comprises a pair of diodes **36*a* and 36*b* connected between metal layer 72 and leg section 71*c* of metal layer 71 of the modulator fin 18. The metal layer 72 is soldered at its bottom edge 79 to the upper surface of the capacitor plate 52 and thereby provides an electrical connection between the modulator fin 18 and the plate 52. The layer 72 also extends onto the tab 18*a*, and a resistor 84 (note FIG. 4) is connected between the tab 18*a* and the lower capacitor plate 58. An electrical lead 89 is connected to the lower plate 58 to enable bias and modulating current (note FIG. 2B) to be applied through the resistor 84 and metal layer 72 to the PIN diodes 36*a*–36*b***.

Like resistors 82, 83 and 85 are respectively connected between tabs **16*a*, 17*a* and 19*a* and lower capacitor plates 56, 57 and 59. Similarly, the modulator fins 16, 17 and 19 are constructed identical to the modulator fin 18, and like reference numberals for the metal layers are used for the modulator fins 16 and 17 as seen in FIGS. 4 and 6. The equivalent electrical circuit of a modulator fin is shown on the right-hand side of FIG. 10B, and will be discussed subsequently. The PIN diodes function as variable resistances at RF frequencies, the resistance of each being a function of the modulating current (note FIG. 2B) applied thereto to create the rotating field strength pattern 42 of FIG. 2A which rotates in a clockwise direction as viewed from the top of the antenna as in FIG. 2A** as the modulating currents to the PIN diodes vary.

Turning again to the suppressor posts 21 through 24, each is identical and, thus, only post 21 will be described in detail. The post 21 includes a length of wire 94 and a screw pin 95 (note FIGS. 1 and 6). The lower end of the wire is soldered to the upper end of the screw pin 95, and the upper end of the wire is soldered at 96 to a dimple in the cone 10. The screw pin 95 rests on the outer edge of the fiberglass dielectric layer 61 and extends through and is electrically connected to the baseplate 11. A standoff 98 is threaded onto the lower end of the screw pin 95, and secures a centering ring 99 to the underside of the baseplate 11 which serves to center the lower cover shield 26. Similar standoffs are threaded onto the screw pins of the remaining suppressor posts 22 through 24. The standoffs, along with a central standoff 100 (note FIGS. 6 and 7), have the upper pc board 27 (note FIG. 1) secured thereto. Similar standoffs or spacers (only spacers 101 and 102 being seen in FIG. 1) are used to support the lower pc board 28, and further spacers (only spacers 103 and 104 being seen in FIG. 1) are used for spacing and securing the lower cover shield 26 to the antenna assembly. A connector 106 (note FIG. 4) is secured to the lower side of the cover shield 26 for enabling electrical connections to be made to the electronic system contained on the pc boards 27 and 28.

The RF coax assembly 29 supplies RF energy to the cone 10 and is shown in greater detail in FIG. 7. The RF coax assembly is mounted to the baseplate 11 with a brass mounting flange 110 which is secured to the baseplate 11 by rivets 111–113 and screw fastener 114.

The assembly includes a silver-plated brass tube 115 soldered to the mounting flange 110, and a standard RF connector including a brass ferrule 117 soldered to the lower end of the tube 115. The connector 116 includes a metal center pin 118 coupled with an insulating member 119. The upper end of the center pin 118 is soldered to a coaxial RF rod 120. The upper RF rod 30 connected to the lower end of the cone 10 is disposed in an opening in the upper end of the rod 120, and insulated therefrom by a capacitor dielectric 121. As will be apparent to those skilled in the art, the lower end of the RF connector 116 receives a mating connector for supplying RF energy to the overall coax assembly shown in FIG. 7 and, thus, to the cone 10.

Figure 10A:
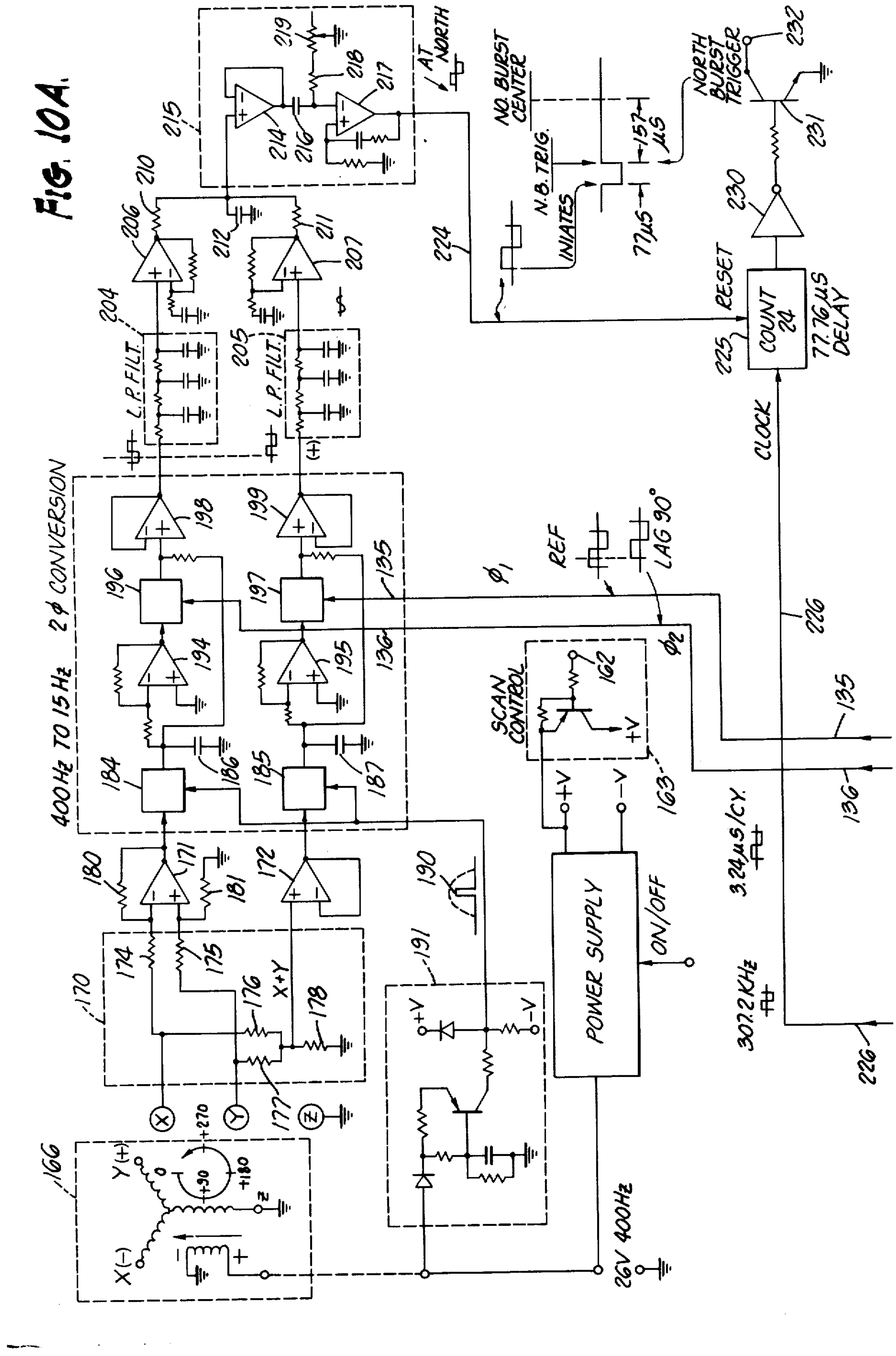
FIGS. 10A-10B illustrate an electronic system for the antenna structure for providing translation between, or a reference with respect to, magnetic north as derived from an airborne compass on one hand and the pattern radiated by the antenna on the other.
Figure 10B:
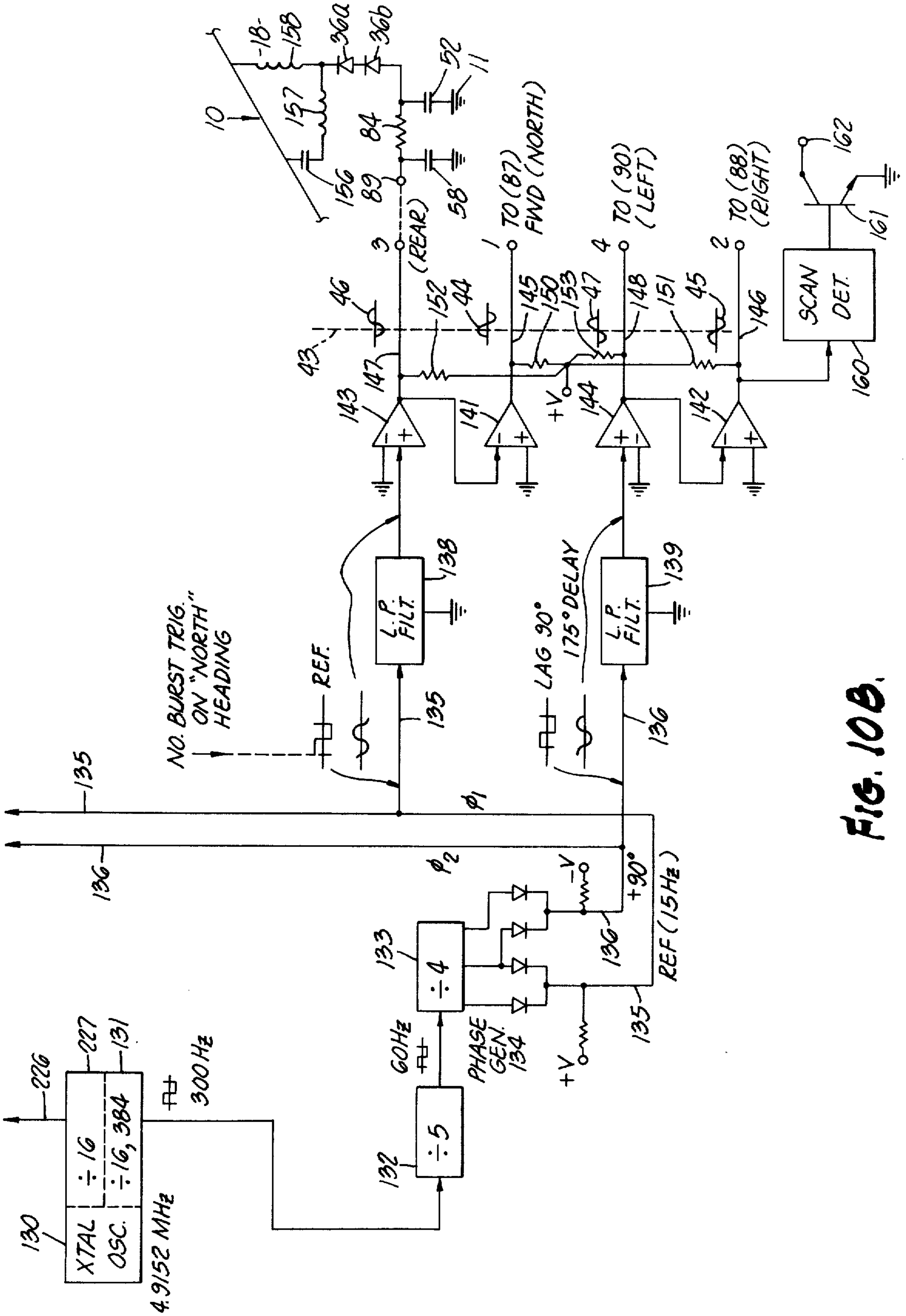

Turning now to the electronic system of FIGS. 10A–10B, the same performs two basic functions; namely, it provides the modulation signals for the PIN diodes of the modulator fins 16 through 19 (this portion of the system is principally shown in FIG. 10B), and provides electrical translation between the radiated pattern and magnetic north (this portion of the system is principally shown in FIG. 10A). This system is physically contained on the circuit boards 27–28 shown in FIG. 1. First considering the former function, and referring to FIG. 10B, a crystal oscillator 130 generates a signal having a frequency of 4.9152MHz which is digitally divided down by divider 131, divider 132 and divider 133 to produce two 90° out-of-phase 15Hz square waves. A phase generator 134 coupled with the output of the third divider 133 provides the 15Hz reference signal ($\phi_1$) on line 135 and a 15Hz 90° lagging signal ($\phi_2$) on line 136. These two signals are filtered by respective low-pass filters 138 and 139. The outputs of the filters 138 and 139 are applied to respective amplifiers 143 and 144 having outputs 147 and 148. The outputs of amplifiers 143 and 144 are connected to inputs of respective amplifiers 141 and 142 which have outputs 145 and 146. The outputs of these four amplifiers 141–144 drive the PIN diodes of the antenna structure. Resistors 150–153 connected with the voltage source and the amplifier output lines 145–148 provide the bias current (note FIG. 2B) to the PIN diodes 34–37.

The amplifier 141 provides the output signal 44 of FIG. 2B which, in turn, is connected (not shown) to the PIN diodes **34*a*–34*b* of modulator fin 16. The 180° out-of-phase signal 46 from the amplifier 143 is applied through lead 89 and resistor 84 to the PIN diodes 36*a*–36*b* of the modulator fin 18 as schematically shown in FIG. 10B. A capacitor 156 of the modulator fin 18 is formed by the metal layer section 71*a* and the metal layer 73 (note FIGS. 4, 8 and 9) of the modulator fin 18. Inductors 157 and 158 are formed by the leg segments 71*b* and 71*c* of the metal layer 71 of the modulator fin 18. The capacitor 156 and inductor 157 function to move the center of the modulation RF current with respect to the cone 10** as the RF frequency increases. This causes the center of the effective polarizing element to move in and provide a substantially constant modulation (e.g., 30%) over a range of RF frequencies. Stated differently, this provides a constant peak magnitude of the reflection or rejection of the launched wave over the frequency band of interest.

A scan detector 160 is connected with the output of the amplifier 142 and supplies a signal to a transistor switch 161 which provides an output on terminal 162 to indicate the status of antenna operation; that is, the antenna is in the "omni mode" (switch 161 open) or is in the "scanning mode" (switch 161 is closed). This indication on the terminal 162 may be used to operate a cockpit panel light, and is used in conjunction with a scan control circuit 163 of FIG. 10A to apply a power supply voltage to various of the electronic components in the scanning mode.

Turning now to the portion of the electronic system shown in FIG. 10A, a typical compass synchro transmitter 166 of an aircraft is shown. It should be noted that the 15Hz rotation of the radiation pattern generated by the present antenna is relative only to the antenna/aircraft mounting, with alignment of the antenna along the longitudinal axis of the aircraft and oriented with respect to forward or the nose of the aircraft. Since the compass read-out is between magnetic north and the forward orientation, there exists a knowledge of the relationship between the 15Hz pattern rotation and the instantaneous magnetic north crossing.

The read-out of the magnetic compass 166 is in the form of a four-wire synchro input. Three of the wires are codes X, Y and Z, where Z is grounded and is also the return for the remaining reference power, which reference power nominally is 400Hz, 26 volts rms ac. As the synchro transmitter is rotated at the compass through 360°, the voltage between XZ, XY, and YZ varies in magnitude, but is either in-phase, zero magnitude, or 180° out-of-phase with the reference power. As is known to those skilled in the art, a synchro receiver solves the magnitude and phase terms by rotating in step with the shaft of the synchro transmitter. In order to solve the translational problem, two synchro shafts could be coupled together in an electro-mechanical configuration, but this involves complex mechanics and electronics, as well as the attendent bulk and weight, in order to generate a two-phase signal at 15Hz corresponding to the compass output.

Accordingly, in the present system a resistor network 170 and two operational amplifiers 171 and 172 are used to perform the coordinate translation from the space equivalent three-phase voltages of the synchro system of a two-phase equivalent, still at the normal 400Hz frequency. The resistive network 170 includes resistors 174 through 178 connected as shown between X, Y and Z synchro signal terminals and the amplifiers 171–172. Resistors 180–181 are connected with the amplifier 171 to set the gain thereof to cause the XY signal at peak magnitude through amplifier 171 to be equal to the peak magnitude derived from amplifier 172. This is the quadrature component. The gain of the amplifier 171 is 1/5. The gain of the amplifier 172 is unity, and its out-put is the in-phase component. The outputs of the amplifiers 171 and 172 are applied through respective switches to capacitors 186 and 187.

By establishing a pulse at the instant of the positive peak of the 400Hz reference, the switches 184–185 are enabled to store dc in the capacitors 186–187 for each phase of the two-phase 400Hz signal. This control pulse 190 for the switches 184 and 185 is generated by a 400Hz signal peak sample detector 191. Thus, signals are stored on the capacitors 186 and 187 proportional to the outputs of the respective amplifiers 171 and 172 when the switches 184 and 185 are enabled by the pulse 190 (at the time of each positive peak of the 400Hz reference). The signals stored on these capacitors have a relative polarity and magnitude equal to the relationship of magnetic north to the nose of the airplane and, thus, the dc relative magnitudes and polarity of these signals is a function of the phase angle resulting from the compass heading data.

The signals on the capacitors 186 and 187 are applied through unity gain amplifiers 194 and 195 to respective switches 196 and 197. The control signals for the switchs 196 and 197 are the 90° out-of-phase 15Hz square waves generated by the phase generator 134 of FIG. 10B which was discussed earlier. The dc values of the input signals to the switches 196 and 197 from respective amplfiers 194 and 195 vary only at the nose of the aircraft varies with respect to magnetic north. The switches 196 and 197, and associated output amplifiers 198 and 199, function to remodulate the stored (by capacitors 186–187) values into 15Hz square waves of two phase 90° relationship, and which also are synchronously time related to where the antenna is pointed at any given instant of rotation. This is accomplished by employing the 90° out-of-phase 15Hz square waves on lines 135 and 136 to control the switches 196 and 197 and, thus, they function to chop the stored dc values as a function of antenna pattern rotation.

The outputs of the amplifiers 198 and 199 are 15Hz square waves and have a polarity and magnitude proportional to the dc value of the signals stored in respective capacitors 186 and 187. These signals are applied through respective low-pass filters 204 and 205, and are amplified by respective amplifiers 206 and 207 to yield a pair of equal amplitude 15Hz sine waves which now bear the compass heading angle phase relationship, but are also synchronous with antenna rotation (that is, the pointing direction of the antenna at any instant). The outputs of these amplifiers 206–207 are summed in a summing circuit comprising resistors 210–211 and a capacitor 212, and the result is applied to the input of a high-gain amplifier 214 of a cross-over detector 215. The output of the amplifier 214 is connected through a capacitor 216, which eliminates dc gain and drift, to the input of an amplifier 217. The capacitor 216 and a resistor 218 provides a leading phase angle of 45°, and the summing network 210–212 provides a lagging phase angle of 45°. A variable resistor 219 enables the circuit to be compensated at the time of manufacture for the phase angles resulting from these circuits. The outputs of the amplifiers 206 and 207 thus are summed and then further amplified with high gain to determine the positive (+) going zero axis cross-over inflation point of the sum.

The output of the amplifier 217 is applied by a line 224 to a delay counter 224 as a reset signal. Counter 225 receives clock pulses on an input line 226, which pulses are derived from a divider 227 (FIG. 10B) connected at the output of the crystal oscillator 130. The output of the counter 225 is connected through an inverting amplifier 230 to the base of a transistor switch 231, the collector of which provides a north burst trigger control signal on output terminal 232. The signal on the output terminal 232 is applied to the Tacan set to generate the north reference burst when the transistor switch 231 closes (goes to ground). The output of the amplifier 217 is a 15Hz square wave pulse, the positive (+) going edge of which initiates a digital delay (77.76us) in the delay counter circuit 225 which in turn generates the north burst trigger control signal as indicated in FIG. 10A above transistor 231. The north burst trigger is generated at the moment of the north bearing line crossing by the proper segment of the rotating antenna pattern only when the nose of the aircraft is on a magnetic north heading. For all other aircraft headings, the change of the rotated position of the antenna pattern is compensated for by the corresponding time (phase) change of the north burst trigger. A receiving aircraft does not perceive any change in heading of the beacon from the source aircraft (the one with the present antenna system) because both the demodulated 15Hz amplitude wave and the regenerated 15Hz reference wave are simultaneously and equally phase advanced or retarded as the beacon-source-aircraft turns, or changes, heading. The foregoing system provides a relatively simple and inexpensive solution to the translation problem.

The antenna structure and system of the present invention provides a suitable and compact antenna for providing a rotating pattern without repairing moving parts or moving elements, and the system also provides a coordinate transformation when the antenna is used on a moving object such as an airplane. In a Tacan application, the antenna normally is mounted on the bottom or the top (or both) of the airplane, and typically projects approximately 2 inches. It is relatively simple to manufacture and is easy to assemble and disassemble. The antenna structure and system likewise can be used for other applications where a rotating pattern is desired, such as for automobile location, short-range navigation for ships, and so forth. The antenna structure and system can also be used as a receiving antenna, referred to as the "inverse mode" in the Tacan art, and can be used to determine bearing from two other antennas.

While embodiments and applications of this invention have been shown and described, it will be apparent to those skilled in the art that modifications are possible without departing from the inventive concepts herein described.

What is claimed is:

1. An antenna for electronically generating a rotating radiation pattern comprising conic means for radiating electro-magnetic energy, baseplate means forming a ground plane, said conic means forming a conic monopole and being mounted above said ground plane, a plurality of modulator fin means disposed between said baseplate means and said conic means for altering the pattern of radiation radiated by said conic means, said modulator fin means including controllable variable resistance means electrically connected to said conic means, and electrical circuit means coupled with said controllable variable resistive means for causing a predetermined out-of-phase change in the resistance of said variable resistive means of at least two of said modulator fin means.

2. An antenna as in claim 1 including suppressor means electrically connected between said conic means and said baseplate means for suppressing portions of the pattern of radiation.

3. An antenna as in claim 1 wherein said modulator fin means comprise four modulator fin means symmetrically arranged 90° apart, and suppressor means are symmetrically disposed between said modulator fin means and are electrically connected between said conic means and said baseplate means.

4. An antenna as in claim 3 wherein said controllable variable resistive means each comprises PIN diode means, and said electrical circuit means comprises an electrical circuit for applying out-of-phase currents to respective pairs of said diode means.

5. An antenna as in claim 1 wherein each of said modulator fin means is electrically connected to said baseplate means by respective capacitor means, said capacitor means being formed of metal plates separated from said baseplate means by a dielectric.

6. An antenna as in claim 5 including a plurality of electro-magnetic energy bypass capacitors, said capacitors being formed of metal plates separated from the underside of said baseplate means by a dielectric, and means electrically connecting the variable resistive means of said fin means to said bypass capacitors.

7. An antenna as in claim 1 wherein said modulator fin means comprise four modulator fins disposed on 90° radials with respect to said baseplate means and said conic means, said electrical circuit means comprises a circuit for generating four 90° out-of-phase signals and includes means for applying said signals to the variable resistance means of the respective four modulator fins and for applying a predetermined bias to said variable resistance means, and suppressor means symmetrically disposed between said modulator fins electrically connected between said conic means and said baseplate means.

8. An antenna as in claim 7 wherein said electrical circuit means comprises oscillator means coupled with phase generator means, said phase generator means providing a reference signal and a 90° lagging signal, and said circuit means comprising amplifiers responsive to said reference signal and said lagging signal for generating said four 90° out-of-phase signals.

9. An antenna as in claim 1 wherein said electrical circuit means comprises clock means and phase generator means for generating a reference signal and a 90° lagging signal from which modulating signals are derived for causing the predetermined out-of-phase change in the resistance of said variable resistive means, and said circuit means further includes means responsive to signals from a magnetic compass and responsive to said reference and lagging signals for generating a control signal which is a function of a compass heading signal related to the pattern generated by said antenna.

10. An antenna for electronically generating a rotating radiation pattern comprising conic means for radiating electro-magnetic energy, baseplate means forming a ground plane, said conic means forming a conic monopole and being mounted above said ground plane, a plurality of modulator fin means disposed between said baseplate means and said conic means for altering the pattern of radiation radiated by said conic means, said modulator fin means including controllable resistance means electrically connected to said conic means, a plurality of suppressor means symmetrically disposed between said modulator fin means, said supressor means being electrically connected between said conic means and said baseplate means for suppressing portions of said pattern of radiation, and electrical circuit means coupled with said controllable resistive means for causing a predetermined out-of-phase change in the resistance of said variable resistive means of at least two of said modulator fin means.

11. An antenna as in claim 10 wherein said modulator fin means comprise four modulator fin means symmetrically arranged 90° apart, and said controllable resistive means each comprises diode means, and said electrical circuit means comprises an electrical circuit for supplying out-of-phase currents to respective pairs of said diode means.

12. An antenna as in claim 10 wherein said modulator fin means comprise at least four modulator fin disposed symmetrically on radials with respect to said baseplate means and said conic means, and said electrical circuit means comprises a circuit for generating at least four out-of-phase signals and includes means for applying said signals to the controllable resistance means of the respective modulator fins and for applying a predetermined bias to said resistance means.

13. An antenna as in claim 10 wherein said electrical circuit means comprises clock means for generating control signals from which modulating signals are derived for causing the predetermined out-of-phase change in the resistance of said controllable resistive means, and said circuit means includes means responsive to signals from a magnetic compass and responsive to said control signals for generating a signal which is a function of a compass heading signal related to the pattern generated by said antenna.

14. A Tacan antenna for electronically generating a rotating 15Hz radiation pattern comprising conic means for radiating electro-magnetic energy, baseplate means forming a ground plane, said conic means forming a conic monopole and being mounted above said ground plane, at least four modulator fin means symmetrically disposed between said baseplate means and said conic means for altering the pattern of radiation radiated by said conic means, said modulator fin means including variable resistance means electrically connected to said conic means, said variable resistive means each comprising diode means, at least four suppressor means symmetrically disposed between said modulator fin means, said suppressor means being electrically connected between said conic means and said baseplate means for suppressing portions of the pattern of radiation, and electrical circuit means coupled with said controllable variable resistive means for causing a predetermined out-of-phase change in the resistance of said variable resistive means of said modulator fin means, said electrical circuit means comprising an electrical circuit for supplying out-of-phase currents to respective pairs of said diode means.

15. An antenna as in claim 14 wherein.

each of said modulator fin means is electrically connected to said baseplate means by respective capacitor means, said capacitor means being formed of metal plates separated from said baseplate means by a dielectric, a plurality of electro-magnetic bypass capacitors, said capacitors being formed of metal plates separated from the underside of said baseplate means by a dielectric, means electrically connecting the variable resistive means of said fin means to said bypass capacitors, said modulator fin means comprise four modulator fins diposed on 90° radials with respect to said baseplate means and said conic means, and said electrical circuit means comprises a circuit for generating four 90° out-of-phase signals and includes means for applying said signals to the variable resistance means of the respective four modulator fins and for applying a predetermined bias to said variable resistance means.

16. An antenna as in claim 15 wherein said electrical circuit means comprises means for generating a reference signal and a 90° lagging signal from which modulating signals are derived for causing the predetermined out-of-phase change in the resistance of said variable resistive means, and said circuit means includes means responsive to signals from a magnetic compass and responsive to said reference and lagging signals for generating a Tacan north burst trigger control signal which is a function of a compass heading signal related to the pattern generated by said antenna.

17. A system for controlling the generation of a heading reference signal from an antenna mounted on an aircraft, which antenna electronically generates a rotating radiation pattern and wherein the antenna includes means for developing said pattern and wherein the system develops an electrical relationship between signals from a magnetic compass of the aircraft and the pattern generated by the antenna, comprising means coupled with the magnetic compass for translating space equivalent three-phase signals thereof to two-phase equivalent signals, means for storing the two-phase equivalent signals, generating means for generating control signals, and means responsive to the control signals for controlling the rotating pattern of the antenna, circuit means responsive to said control signals for modulating the stored signal as a function of radiation pattern rotation, and for developing signals defining the compass heading phase angle relationship synchronized with said radiation pattern rotation, and means responsive to said circuit means for generating said heading reference signal.

18. A system for electronically relating the rotating pattern of an antenna to a predetermined compass heading wherein the antenna and compass are adapted to be mounted on an object which changes direction, and wherein the compass includes a compass synchro transmitter and the antenna electronically generates a rotating radiation pattern, comprising combining means for combining signals from the compass synchro transmitter and for performing a coordinate translation from space equivalent three-phase signals of the compass synchro system to a two-phase equivalent, means responsive to said combining means for storing signals having a relative polarity and magnitude proportional to the relationship of the predetermined compass heading to a point on the object, switching means for modulating the stored signals into signals of predetermined frequency and phase relationship which are synchronously time related to the pattern generated by the antenna and for yielding the signal waves representing the compass heading phase angle relationship synchronized with antenna pattern rotation, and combining means for receiving said signal waves and generating a predetermined reference signal related to said predetermined compass heading.

19. A system as in claim 20 wherein said object is an aircraft, said antenna generates a 15Hz Tacan radiation pattern, said compass synchro transmitter provides four signals which are combined by said combining means, and said predetermined compass heading is magnetic north and the point on the object represents the nose of the aircraft, the compass synchro transmitter receives an alternating current reference, and the storage means stores signals at each positive peak of said alternating current reference, said switching means receives 90° out-of-phase 15Hz switching signals, and said predetermined reference signal generated is a Tacan north burst trigger control signal.

* * * * *